United States Patent
Moench et al.

(10) Patent No.: US 8,806,436 B2
(45) Date of Patent: Aug. 12, 2014

(54) SYSTEMS AND METHODS FOR DEBUGGING APPLICATIONS USING DUAL CODE GENERATION

(75) Inventors: Robert Warren Moench, Eagan, MN (US); Robert Cushman Clark, Eagan, MN (US)

(73) Assignee: Cray Inc., Seattle, WA (US)

( * ) Notice: Subject to any disclaimer, the term of this patent is extended or adjusted under 35 U.S.C. 154(b) by 670 days.

(21) Appl. No.: 12/771,432

(22) Filed: Apr. 30, 2010

(65) Prior Publication Data
US 2011/0271259 A1 Nov. 3, 2011

(51) Int. Cl.
*G06F 9/44* (2006.01)
*G06F 11/36* (2006.01)

(52) U.S. Cl.
CPC .................................. *G06F 11/3628* (2013.01)
USPC ............ 717/124; 717/127; 717/128; 717/129

(58) Field of Classification Search
CPC combination set(s) only.
See application file for complete search history.

(56) References Cited

U.S. PATENT DOCUMENTS

| | | | | |
|---|---|---|---|---|
| 5,560,009 | A * | 9/1996 | Lenkov et al. | 717/124 |
| 6,795,963 | B1 * | 9/2004 | Andersen et al. | 717/130 |
| 7,024,663 | B2 * | 4/2006 | Klein | 717/127 |
| 7,111,281 | B2 * | 9/2006 | Bates et al. | 717/129 |
| 7,134,115 | B2 * | 11/2006 | Kawai et al. | 717/124 |
| 7,870,396 | B2 * | 1/2011 | Kamei | 713/190 |
| 2003/0033592 | A1 * | 2/2003 | Tsubata et al. | 717/128 |
| 2003/0149961 | A1 * | 8/2003 | Kawai et al. | 717/129 |
| 2004/0010777 | A1 * | 1/2004 | Klein | 717/127 |
| 2004/0128655 | A1 * | 7/2004 | Bates et al. | 717/129 |
| 2005/0081107 | A1 * | 4/2005 | DeWitt et al. | 714/38 |
| 2006/0064676 | A1 * | 3/2006 | Chavan | 717/124 |
| 2007/0118763 | A1 * | 5/2007 | Kamei | 713/190 |

OTHER PUBLICATIONS

Deborah S. Coutant et al.; DOC A Practical Approach to Source-Level Debugging of Globally Optimized Code; 1988 ACM; pp. 125-134; <http://dl.acm.org/citation.cfm?id=54003>.*
Craig Chambers et al.; Debuggin Optimized Code with Dynamic Deoptimization; 1992 ACM; pp. 32-43; <http://dl.acm.org/citation.cfm?id=143114>.*
Gary Brooks et al.; A New Approach to Debugging Optimized code; 1992 ACM; 11 pages; <http://dl.acm.org/citation.cfm?id=143108>.*
John Hennessy; Symbolic Debugging of Optimized code; 1982 ACM; pp. 3223-344; <http://dl.acm.org/citation.cfm?id=357173>.*
Le-Chun Wu; A New Framework for Debugging Globally Optimized Code; 1999 ACM; pp. 181-191; <http://dl.acm.org/citation.cfm?id=301663>.*
Thomas Gross; Source-Level Debugging of Scalar Optimized Code; 1996 ACM; pp. 33-43; <http://dl.acm.org/citation.cfm?id=231388>.*

* cited by examiner

*Primary Examiner* — Thuy Dao
*Assistant Examiner* — Cuong V Luu
(74) *Attorney, Agent, or Firm* — Perkins Coie LLP (57) ABSTRACT

Systems and methods provide a debugger that debugs code using two versions of code, an optimized and a debuggable version of object code for subroutines, methods or functions. The debugger causes the appropriate version of the code to be executed depending on whether debug commands have been applied with respect to particular subroutines, methods or functions.

16 Claims, 6 Drawing Sheets

SYSTEMS AND METHODS FOR DEBUGGING APPLICATIONS USING DUAL CODE GENERATION

FIELD

The embodiments of the present invention relate to software development and more particularly to debuggers for software applications.

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever. Copyright® 2009 Cray Inc.

BACKGROUND

Development of software applications typically involve the frequent use of debuggers to analyze logical errors and other problems that occur during the execution of the application. Such debugging occurs both while the application is being developed or enhanced, and after the application has been provided (e.g., released) for general use. In order for a debugger application to present a user with accurate information and control of a running computer program, the program must have been compiled with a special debugging option. This option, for example, causes the compiler to generate a set of debugging tables with information that enables the debugger to map the low-level machine instructions of the program to the high-level source code with which the user is familiar. To make this mapping usable, the compiler generally must not re-order, or replace program instructions dictated by the user in the source code. This is in direct conflict with the optimizations that modern compilers can make in order to increase the speed and performance of the program. There are a great number of such optimizations and it is the norm for all of them to be disabled during a compilation using the debugging option.

Therefore, users debugging large computer programs typically have to choose between program execution speed (compiled optimizations) and debugging efficacy (compiled debugger information).

Furthermore, the program generated by compiling with such debugging options may be a significantly different program and may behave differently compared to the original program. Subtle timing windows, memory usage, and even compiler bugs may cause a change in behavior. The program may, in fact, no longer exhibit the symptom that the debugger was called upon to research.

DETAILED DESCRIPTION

In the following detailed description, reference is made to the accompanying drawings that form a part hereof, and in which is shown by way of illustration, specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

In the Figures, the same reference number is used throughout to refer to an identical component which appears in multiple Figures. Signals and connections may be referred to by the same reference number or label, and the actual meaning will be clear from its use in the context of the description.

The functions or algorithms described herein are implemented in hardware, and/or software in embodiments. The software comprises computer executable instructions on computer readable media. Non-transitory computer-readable media include tangible media such as hard drives, CD-ROMs, DVD-ROMS, and memories such as ROM, RAM, and Compact Flash memories that can store instructions. Signals on a carrier wave such as an optical or electrical carrier wave are examples of transitory computer-readable media. Further, such functions correspond to modules, which are software, hardware, firmware, or any combination thereof. Multiple functions are performed in one or more modules as desired, and the embodiments described are merely examples. A digital signal processor, ASIC, microprocessor, or any other type of processor operating on a system, such as a personal computer, server computer, supercomputing system, a router, or any other device capable of processing data including network interconnection devices executes the software.

Some embodiments implement the functions in two or more specific interconnected hardware modules or devices with related control and data signals communicated between and through the modules, or as portions of an application-specific integrated circuit. Thus, the example process flow is applicable to software, firmware, and hardware implementations.

Figure 1:
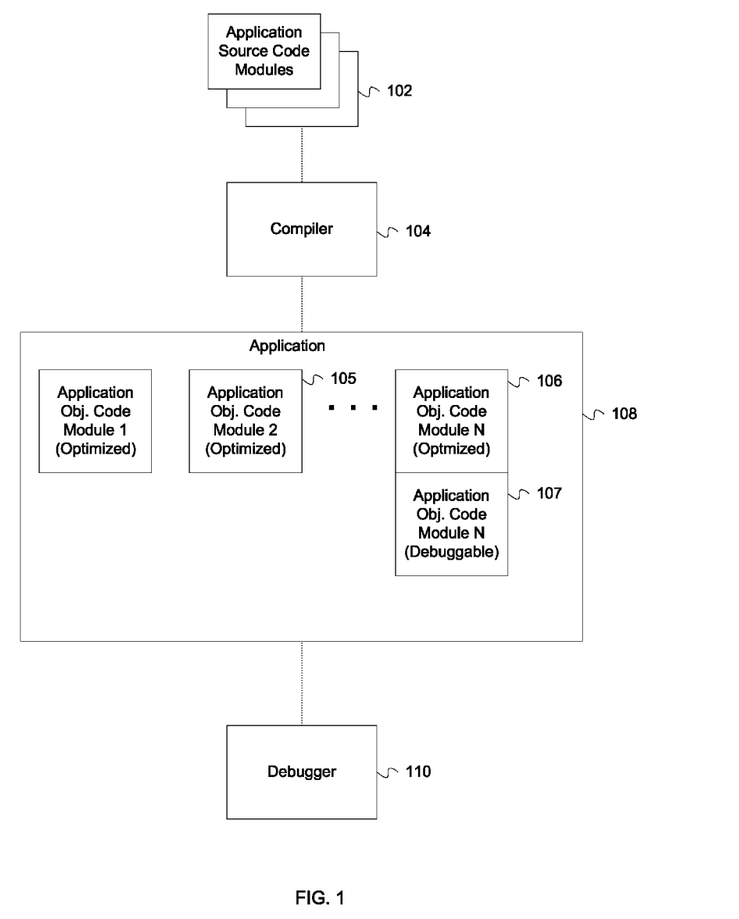
FIG. 1 illustrates example components for building and debugging software applications according to embodiments of the invention.

FIG. 1 illustrates example components of a system 100 for building a software application according to embodiments of the invention. In some embodiments, the system includes a compiler 104 and a debugger 110. Compiler 104 reads one or more application source code modules 102 as input and produces application 108 as output. Application 108 may include object code modules 105-107 that correspond to source code modules 102. Application 108 may also include library modules or references to dynamically loaded library modules that are loaded when the application is executed. Compiler 104 may include or invoke various other components such as preprocessors, optimizers, linkers and/or loaders to complete the building of an application 108. Source modules 102 may be in any programming language, including C, C++, C#, FORTRAN etc.

Compiler 104 may be configured to produce multiple types of object code for a source code module 102. For example, the compiler may produce both optimized object code 106 and debuggable object code 107 for subroutines (also referred to as methods or functions) within a source code module 102. In general, optimized object code 106 will include any type of object code that is not specifically configured for debugging, and may include various levels of code optimization known in the art or developed in the future. Debuggable object code refers to object code that is intended to be used within the context of a debugger. The determination of when to generate both optimized and debuggable object code versions may be controlled by configuration files, compiler switches, user input, environment variables, default settings, etc. Further, debuggable code for a specific region (e.g., a block of code such as a loop) within a source module may be identified using compiler directives in the source code. In some embodiments, the compiler generates code for application 108 such that the optimized object code is executed as a default condition. Applications may be built that contain both debuggable and optimized versions of some routines, while other routines may exist in the application only in an optimized form.

When a user desires to debug application 108, debugger 110 is invoked, which reads application 108 to obtain debugging information and to control the execution of application 108. Debugger 110 may modify memory locations occupied by application 108 as described in further detail below to cause the debuggable object code to be executed instead of the optimized object code.

In some embodiments, the hardware execution environment for debugger 110 may be a single processor environment or a multiple processor hardware environment. There may be four, tens, hundreds, or even thousands of processors in the hardware execution environment for debugger 110. In general, a processor may be any type of processor, including scalar processors, vector processors, central processing units or any other logic circuit that can execute instructions and manipulate data.

Figure 2:
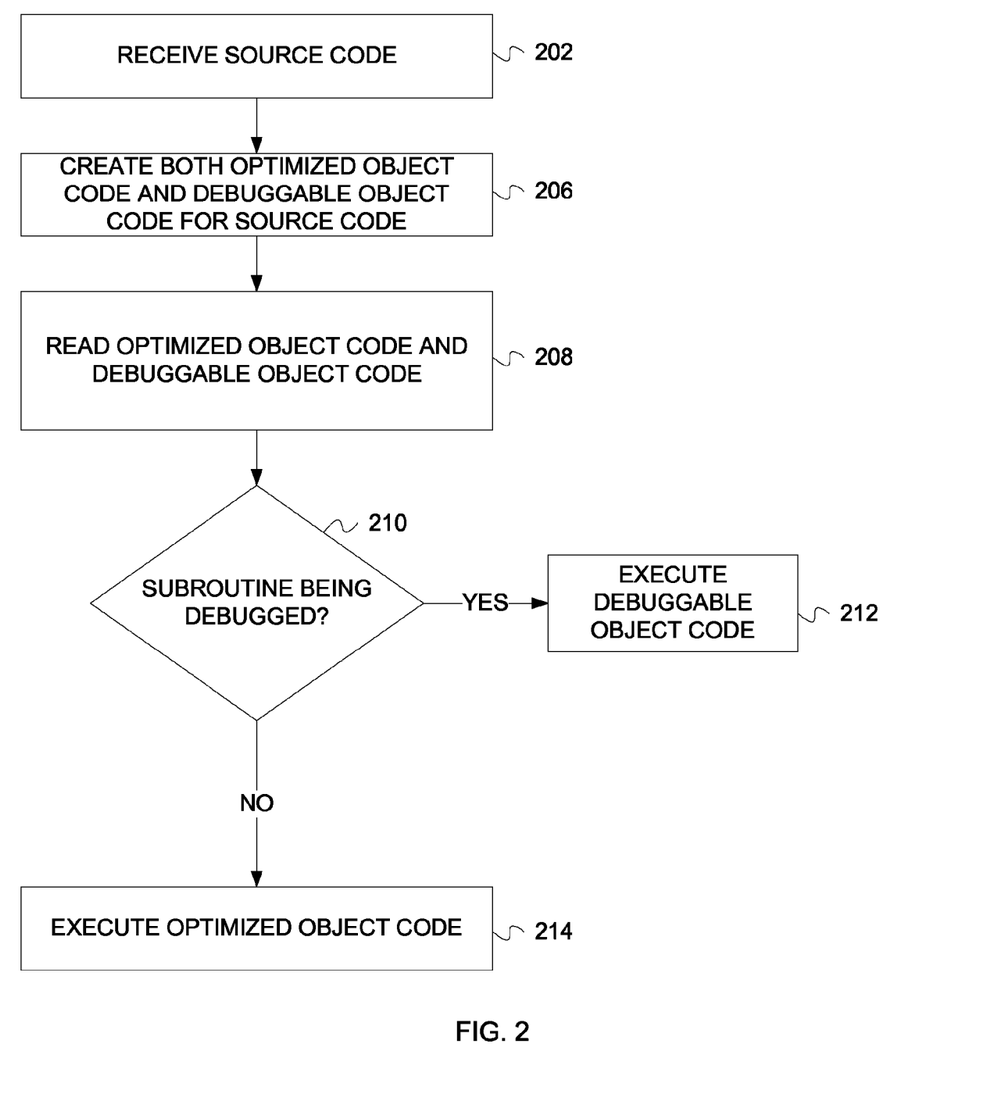
FIG. 2 is a flowchart illustrating an exemplary method for a debugger using optimized and debuggable object code versions of subroutines.

FIG. 2 is a flowchart illustrating an exemplary method for a debugger using optimized and debuggable object code versions of subroutines. The method begins at block 202 when a compiler 104 receives source code to be compiled. At block 206, the compiler creates both optimized and debuggable versions of object code for the subroutines and data produced from source code. In some embodiments, the compiler prevents name conflicts that would result from duplicate names in the optimized and debuggable object code versions by generating different subroutine names (also referred to as labels) for each version. For example, assume that a subroutine, method or function is named "interf" in the source code. In some embodiments, the compiler may preserve the name "interf" for the subroutine generated in the optimized object code, while generating a different name for the subroutine in the debuggable object code. In some embodiments, the different name may be generated by modifying the name from the source code. For example, a text string such as "_debug" may be appended to generate the subroutine name in the debuggable version of the object code. In the example above, this would result in the name "interf" for the optimized object code and "interf_debug" for the debuggable object code. As an alternative example, a text string may be placed at the front of the name. In some embodiments, the string dbg$ is prepended to the front of the subroutine name. In further alternative embodiments, labels for subroutines comprise symbols generated by the compiler that do not necessarily include the name or label used in the source code.

After the application has been built using the object code produced by the compiler, at block 208 a debugger may read the object code, including both the optimized and debuggable versions of the object code.

At block 210, the debugger determines that a subroutine is to be debugged. This determination may be made as a result of receiving a breakpoint command or step command from a user operating the debugger. A subroutine may be determined to be debugged if a breakpoint is set at any point within the subroutine. Further, a subroutine may be debugged by instructions issued to a debugger that indicate that the debugger is to "step into" the subroutine to be debugged. Other methods of indicating that a debuggable version of code is to be executed are possible and within the scope of the inventive subject matter.

If the debugger determines that the subroutine is being debugged, then at block 212 the debugger executes operations that cause the debuggable version of the object code to be executed. Further details are provided below with reference to FIGS. 3 and 4.

Otherwise, if the subroutine is not being debugged, the optimized object code is executed at block 214.

Thus the embodiments of the invention provide an environment where an application executes optimized code and therefore runs at the fastest speed when not being debugged, while automatically substituting debuggable object code when a user is interested in debugging or studying the operation of the code or any specific portion of the code.

Figure 3:
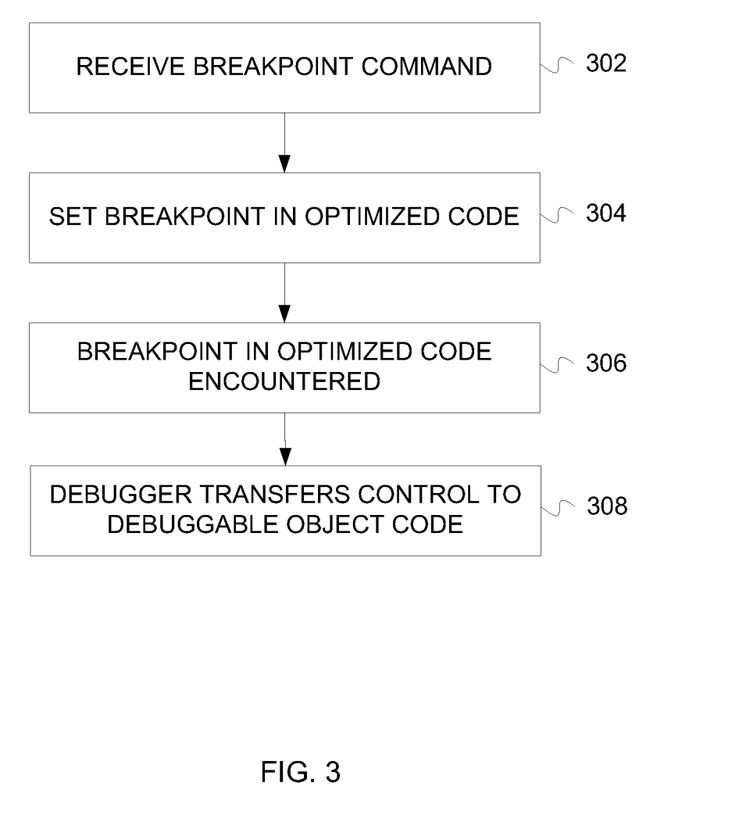
FIG. 3 is a flowchart illustrating an exemplary method for a breakpoint operation of a debugger using optimized and debuggable object code versions of subroutines according to embodiments of the invention.

FIG. 3 is a flowchart illustrating an exemplary method according to various embodiments for a breakpoint operation of a debugger using optimized and debuggable object code versions of subroutines. As noted above, debugger 110 may detect that a breakpoint has been set in a subroutine by receiving a breakpoint command at block 302.

In response to receiving the breakpoint command, in some embodiments, the debugger 110 sets a breakpoint in the optimized object code at block 304. Methods for setting a breakpoint vary according to the hardware environment and operating system that is used, such methods are known to those of skill in the art.

At block 306, the breakpoint is encountered during the execution of the code.

At block 308, the debugger fields the breakpoint instruction. In response, the debugger causes the flow of control to be transferred to the debuggable object code. In some embodiment, the debugger may change the program counter to cause control to be transferred to a desired point in the debuggable object code for the program.

In some embodiments, breakpoints are set in both the optimized and debuggable versions of the object code. It is possible that a user may decide to set a breakpoint in an debuggable subroutine after the subroutine has already been invoked once. For example, assume that routine "A" makes a call to routine "B", which calls "C", which in turn calls "B" a second time. Further assume that routine "B" has both an optimized and debuggable version of object code. During the course of debugging routine "C", the user may have set a breakpoint such that B has already been at least partially executed by virtue of the call from "A" to "B". Setting a breakpoint in both the optimized and debuggable versions of "B" allows the system to honor the user's request (e.g., break at routine "B") and to follow the original path when unwinding the stack upon subroutine returns.

Figure 4:
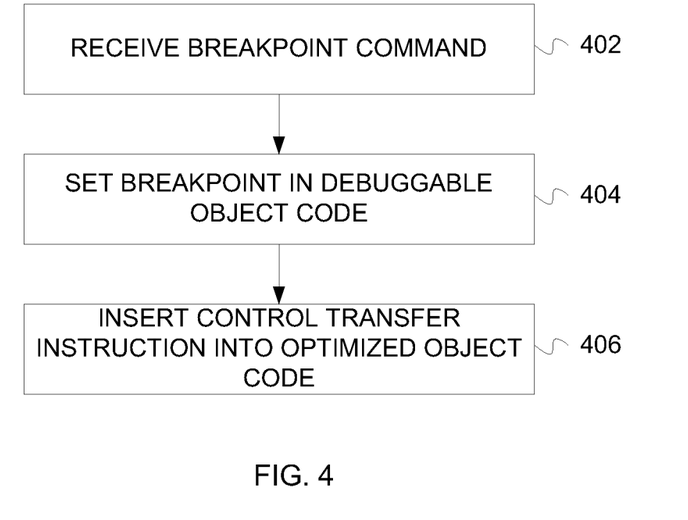
FIG. 4 is a flowchart illustrating an exemplary method for a breakpoint operation of a debugger using optimized and debuggable object code versions of subroutines according to alternative embodiments of the invention.

FIG. 4 is a flowchart illustrating an exemplary method for a breakpoint operation of a debugger using optimized and debuggable object code versions of subroutines. As noted above, debugger 110 may detect that a breakpoint has been set in a subroutine by receiving a breakpoint command at block 402.

In response to receiving the breakpoint command, in some embodiments, the debugger 110 sets a breakpoint in the debuggable object code at block 404. Methods for setting a breakpoint vary according to the hardware environment and operating system that is used, such methods are known to those of skill in the art.

At block 406, the debugger inserts a control transfer instruction such that the control transfer instruction is the first instruction executed when the optimized subroutine is invoked. The instruction presently at the location where the control transfer instruction is inserted may be saved so that it can be replaced if the breakpoint is removed. The control transfer instruction causes control to be transferred to the object code for the debuggable version of the subroutine. In some embodiments, a "jump" instruction may be used to cause control to be transferred from the optimized object code to the debuggable object code for the subroutine. Other methods for transferring control may be used in alternative embodiments, and the scope of the inventive subject matter is not limited to any particular method for changing the flow of execution of a program. For example, the debugger may change the program counter to cause control to be transferred to a desired point in the program.

Figure 5:
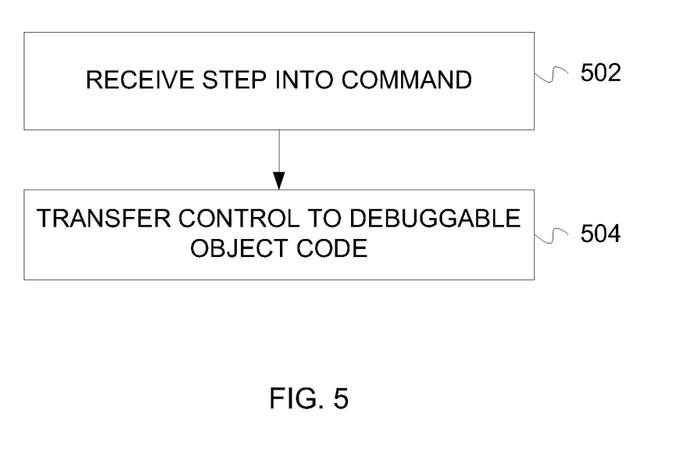
FIG. 5 is a flowchart illustrating an exemplary method for a "step into" operation of a debugger using optimized and debuggable object code versions of subroutines.

FIG. 5 is a flowchart illustrating an exemplary method for a "step into" operation of a debugger using optimized and debuggable object code versions of subroutines. At block 502, the debugger receives a "step into" command. A "step into" command generally refers to a command that causes a debugger to continue execution from a subroutine, method, or function that is being debugged into a subroutine, method or function that is called by the subroutine.

In response to receiving a "step into" command, at block 504 the debugger determines if there is a debuggable version of the subroutine, method or function. If so, the debugger sets the application context such that execution of the application is set to start at the debuggable version of the subroutine, method or function to be stepped into. If a debuggable version is not available as part of the application, the debugger continues execution at the optimized version of the subroutine, method or function.

Figure 6A:
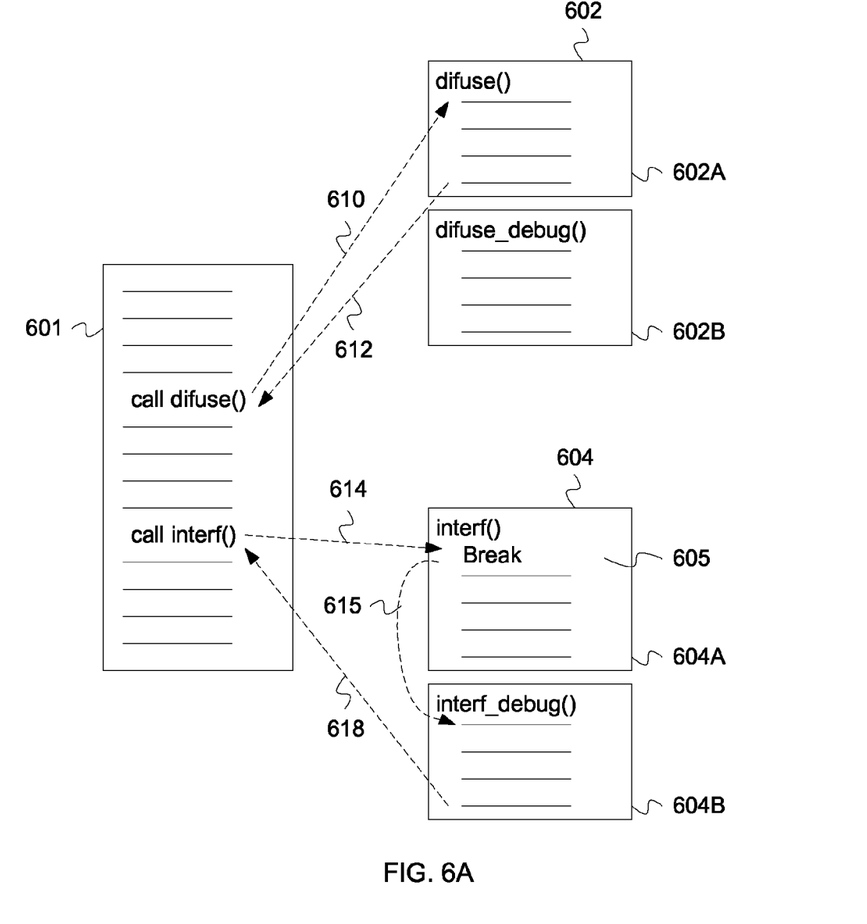
FIG. 6A is a diagram illustrating a breakpoint operation of a debugger using optimized and debuggable object code versions of subroutines according to embodiments of the invention.

FIG. 6A is a diagram illustrating an example breakpoint operation of a debugger using optimized and debuggable object code versions of subroutines, and further illustrates the operation of the method shown in FIGS. 2 and 3. For the purposes of the example, assume that an object code segment 601 makes calls to two subroutines, "difuse" 602 and "interf" 604. Further, subroutines difuse and interf have been compiled such that two versions, an optimized version "A" and a debug version "B" have been generated. Thus in the example shown, the subroutine difuse has an optimized and a debuggable version of object code 602A and 602B respectively, and the subroutine interf also has an optimized and a debuggable version 604A and 604B respectively.

For the purposes of the example, further assume that a breakpoint has been set in subroutine interf. In response, the debugger has inserted a break instruction 605 at the head of the optimized version of interf.

As the executable code segment 601 is executed, a call is first made to the difuse subroutine. Because there are no breakpoints or other debug events for the difuse subroutine, control is transferred as shown by line 610 to the optimized version of difuse. When the subroutine ends, control is transferred back into the calling point as shown by line 612.

Later, executable code segment 601 makes a call to the subroutine interf. As noted above, interf has a breakpoint set. In this case, control first transfers to the optimized version of interf as shown by line 614. Upon reaching the break instruction, the debugger takes control. The debugger takes actions to arrange for control of the program to continue at the appropriate point in the debuggable version of the object code, as illustrated by line 615. For example, the debugger may alter the program counter to cause execution to resume in the debuggable version of the object code. After the debuggable version has finished execution, control returns to the executable cod segment 601 as illustrated by line 618.

Thus various embodiments provide executable code for a software application or other computer programs that can run at full speed when not being debugged, and can select portions of an application to be debugged when necessary to analyze problems. Such selective enabling of debuggable code in various embodiments allows debugging such that the application retains accurate and efficient debugger control, while also maximizing the runtime execution speed and minimizing changes in the program's behavior.

Figure 6B:
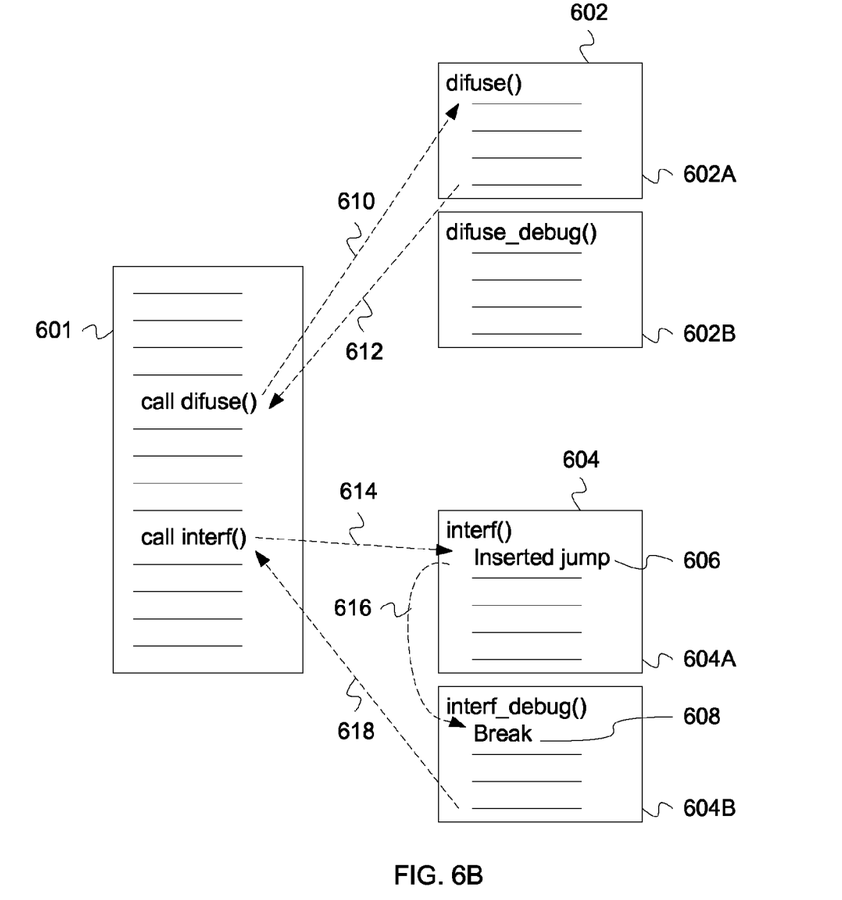
FIG. 6B is a diagram illustrating a breakpoint operation of a debugger using optimized and debuggable object code versions of subroutines according to alternative embodiments of the invention.

FIG. 6B is a diagram illustrating an example breakpoint operation of a debugger using optimized and debuggable object code versions of subroutines, and further illustrates the operation of the method shown in FIGS. 2 and 4. This example, will use the same initial object code arrangement as described above regarding FIG. 6A.

For the purposes of the example, assume that a breakpoint 608 has been set in interf debug( ). In response, the debugger has inserted a control transfer instruction 606 (in this example, a jump instruction) at the head of the optimized version of interf such that control is transferred to the debuggable version of interf, where a break instruction 608 has been inserted by the debugger.

As the executable code segment 601 is executed, a call is first made to the difuse subroutine. Because there are no breakpoints or other debug events for the difuse subroutine, control is transferred as shown by line 610 to the optimized version of difuse. When the subroutine ends, control is transferred back into the calling point as shown by line 612.

Later, executable code segment 601 makes a call to the subroutine interf. As noted above, interf has a breakpoint set. In this case, control first transfers to the optimized version of interf as shown by line 614. However, as indicated by line 616, the jump instruction cause control to jump to the first executable line of code in the debuggable version of interf (604B). Here control continues until the breakpoint instruction 608 is executed and the debugger takes control. After the debuggable version has finished execution, control returns to the executable cod segment 601 as illustrated by line 618.

Thus various embodiments provide executable code for a software application or other computer programs that can run at full speed when not being debugged, and can select portions of an application to be debugged when necessary to analyze problems. Such selective enabling of debuggable code in various embodiments allows debugging such that the application retains accurate and efficient debugger control, while also maximizing the runtime execution speed and minimizing changes in the program's behavior.

The Abstract is provided to comply with 37 C.F.R. §1.72(b) to allow the reader to quickly ascertain the nature and gist of the technical disclosure. The Abstract is submitted with the understanding that it will not be used to limit the scope or meaning of the claims.

In the foregoing Detailed Description, various features are grouped together in a single embodiment for the purpose of streamlining the disclosure. This method of disclosure is not to be interpreted as reflecting an intention that the claimed embodiments have more features than are expressly recited in each claim. Thus the following claims are hereby incorporated into the Detailed Description, with each claim standing on its own as a separate embodiment.

The foregoing descriptions of specific embodiments of the present invention have been presented for purposes of illustration and description. The embodiments presented are not intended to be exhaustive or to limit the invention to the particular forms disclosed. It should be understood that one of ordinary skill in the art can recognize that the teachings of the detailed description allow for a variety of modifications and variations that are not disclosed herein but are nevertheless within the scope of the present invention. Accordingly, it is intended that the scope of the present invention be defined by the appended claims and their equivalents, rather than by the description of the embodiments.

What is claimed is:

1. A method for execution by one or more processors, the method comprising:
   receiving executable code having a plurality of subroutines, a subroutine of the executable code having optimized object code as a first version and having debuggable object code as a second version, the first version and the second version being distinct, the optimized object code and the debuggable object code being generated by a compiler; and
   when debugging the executable code,
      upon determining that the subroutine is to be debugged, causing the debuggable object code of the subroutine to be executed wherein the optimized object code is not executed and wherein causing the debuggable object code to be executed comprises inserting an instruction in the optimized object code that causes control to be transferred to the debuqqable object code; and
      when the subroutine is not to be debugged, causing the optimized object code to be executed wherein the debuqqable object code is not executed.

2. The method of claim 1, wherein the instruction is a jump instruction.

3. The method of claim 1, wherein inserting the instruction into the optimized code comprises:
   inserting a break instruction in the optimized object code; and
   upon executing the break instruction, fielding by a debugger the break instruction and causing control to be transferred to the debuggable object code.

4. The method of claim 1, wherein a subroutine name for the debuggable object code comprises a modification of the subroutine name for the optimized object code.

5. A system comprising:
   one or more processors;
   executable code for an application to be executed by the one or more processors, the executable code having a plurality of subroutines, one or more of the plurality of subroutines having a first version comprising optimized object code and a second version comprising debuggable object code, the first version and the second version being distinct, the optimized and the debuggable object codes being generated by a compiler; and
   a debugger executed by the one or more processors, the debugger to:
   upon determining that a subroutine is to be debugged, cause the debuggable object code to be executed by inserting an instruction in the optimized object coed that causes control to be transferred to the debuggable object code wherein the optimized object code is not executed;
   when the subroutine is not to be debugged, causing the optimized object code to be executed wherein the debuggable object code is not executed.

6. The system of claim 5, wherein the instruction is a jump instruction.

7. The system of claim 5, wherein upon determining the subroutine is to be debugged, the debugger:
   sets a breakpoint in the subroutine;
   inserts a break instruction in the optimized object code; and
   upon execution of the break instruction, fields the break instruction and causes control to be transferred to the debuggable object code.

8. The system of claim 5, wherein a subroutine name for the debuggable object code comprises a modification of the subroutines name for the optimized object code.

9. A computer-readable memory having stored thereon instructions for causing one or more processors to perform operations comprising:
   receiving executable code having a plurality of subroutines, one or more of the plurality of subroutines having a first version comprising optimized object code and a second version comprising debuggable object code, the first version and the second version being distinct, the optimized object code and the debuggable object code being generated by a compiler; and
   upon determining a subroutine is to be debugged, causing the debuggable object code of that subroutine to be executed during execution of the executable code wherein the optimized code is not executed and wherein causing the debuggable object code to be executed comprises inserting an instruction in the optimized object code that causes control to be transferred to the debuggable object code; and
   when that subroutine is not to be debugged, causing the optimized object code to be executed wherein the debuggable object code is not executed.

10. The computer-readable memory of claim 9, wherein determining the subroutine is to be debugged comprises setting a breakpoint in the subroutine, and wherein the breakpoint is set in the debuggable object code.

11. The computer-readable memory of claim 9, wherein the instruction is a jump instruction.

12. The computer-readable memory of claim 9, wherein determining the subroutine is to be debugged comprises setting a breakpoint in the subroutine, and wherein the operations further comprise:
   inserting a break instruction in the optimized object code; and
   upon executing the break instruction, fielding by a debugger the break instruction and causing control to be transferred to the debuggable object code.

13. The computer-readable memory of claim 9, wherein determining the subroutine is to be debugged comprises receiving a command in a debugger to step into the subroutine and wherein causing the debuggable object to be executed comprises transferring control of the executable code to the debuggable object code.

14. The computer-readable memory of claim 9, wherein a subroutine name for the debuggable object code comprises a modification of the subroutine name for the optimized object code.

15. A computer-readable memory having stored thereon instructions comprising instructions for controling a computer to:
  during debugging of executable code having subroutines and when a subroutine is to be executed,
    execute a first version of the subroutine and not a second version of the subroutine when the subroutine is not being debugged; and
    execute the second version of the subroutine and not the first version of the subroutine when the subroutine is being debugged, execution of the second version of the subroutine caused by inserting an instruction into the first version that causes control to transfer to the second version
  wherein the first version and the second version are distinct and
  wherein the first version and the second version of the subroutine are generated by a compiler with the first version being optimized object code having an optimization and the second version being debuggable object code not having that optimization.

16. The computer-readable memory of claim 15 wherein the compiler generates debugging information when compiling the second version to facilitate debugging of the subroutine.

* * * * *

UNITED STATES PATENT AND TRADEMARK OFFICE
CERTIFICATE OF CORRECTION

| | | |
|---|---|---|
| PATENT NO. | : 8,806,436 B2 | Page 1 of 1 |
| APPLICATION NO. | : 12/771432 | |
| DATED | : August 12, 2014 | |
| INVENTOR(S) | : Robert Warren Moench et al. | |

It is certified that error appears in the above-identified patent and that said Letters Patent is hereby corrected as shown below:

On the Title page, in item (56), in column 2, under "Other Publications", line 4, delete "Debuggin" and insert -- Debugging --, therefor.

In the Drawings:

On sheet 1 of 6, in Figure 1, Referral Numeral 106, line 4, delete "(Optmized)" and insert -- (Optimized) --, therefor.

In the Specification:

In column 1, line 19, delete "®" and insert -- © --, therefor.

In the Claims:

In column 7, line 45, in claim 1, delete "debuqqable" and insert -- debuggable --, therefor.

In column 7, line 49, in claim 1, delete "debuqqable" and insert -- debuggable --, therefor.

In column 8, line 9, in claim 5, delete "coed" and insert -- code --, therefor.

In column 8, line 26-27, in claim 8, delete "subroutines" and insert -- subroutine --, therefor.

In column 9, line 9, in claim 15, delete "controling" and insert -- controlling --, therefor.

Signed and Sealed this
Twenty-fifth Day of November, 2014

Michelle K. Lee
*Deputy Director of the United States Patent and Trademark Office*